UNITED STATES PATENT OFFICE.

AMOS BOND, OF PHILADELPHIA, PENNSYLVANIA, ASSIGNOR TO HIMSELF AND LEWIS B. LOUX, OF SAME PLACE.

IMPROVED COMPOSITION FOR BLACKING AND POLISHING LEATHER.

Specification forming part of Letters Patent No. 39,986, dated September 15, 1863.

*To all whom it may concern:*

Be it known that I, AMOS BOND, of Philadelphia, Pennsylvania, have invented a new Composition to be used for Blacking and Polishing Leather; and I do hereby declare the following to be a full, clear, and exact description of the same.

My invention consists of a composition of asphaltum or its equivalent, beeswax, and benzine or other equivalent solvent, prepared substantially in the manner described hereinafter, the said composition to be used on leather for rendering the same water-proof and imparting to it a brilliant and durable polish.

In order to enable others to make and use my invention, I will now proceed to describe the manner of compounding and applying the same.

I dissolve asphaltum in benzine, spirits of turpentine, or other solvents, the proportion of which in respect to the asphaltum should be such that the solution will be about the consistency of cream. In order to facilitate the dissolving of the asphaltum, the benzine or turpentine should be so far heated that it will be safe from ignition or explosion. While the solution is still hot I add a quantity of beeswax, the proportion of which may be varied according to the desired consistency of the composition. I prefer to use the Persian or Trinidad asphaltum, as I have found it to be the most serviceable in the preparation of my composition. Other bitumens, however, may be used, and even ordinary coal-tar dissolved in benzine and mixed with a proper quantity of beeswax makes an available composition to be used for blacking and polishing harness, boots, shoes, &c. The asphaltum has the property of rendering the leather water-proof, and when combined with beeswax is capable of receiving a fine polish.

After the composition has been applied to the leather and the latter polished the simple use of a dry brush will restore the polish after it has become dull, a second application of the composition being in most cases necessary.

The proportions of the ingredients may be varied. Should a liquid blacking be required, more of the solvent may be used, and in making a paste-blacking less of the solvent and more of the beeswax and asphaltum.

Although the asphaltum renders the composition of a dark color, a more brilliant black can be imparted by the addition of a small quantity of lamp or bone black.

I claim as my invention and desire to secure by Letters Patent—

A composition of asphaltum or its equivalent, beeswax, and benzine or other equivalent solvent, prepared substantially in the manner and for the purpose described.

In testimony whereof I have signed my name to this specification in the presence of two subscribing witnesses.

AMOS BOND.

Witnesses:
HENRY HOWSON,
JOHN WHITE.